Sept. 14, 1937.   D. H. REEVES   2,093,137
REFRIGERATING APPARATUS
Filed Jan. 17, 1934   2 Sheets-Sheet 1

Inventor
Donald H. Reeves.
By Spencer, Hardman, and Fehr.
his Attorneys

Patented Sept. 14, 1937

2,093,137

UNITED STATES PATENT OFFICE 2,093,137

REFRIGERATING APPARATUS

Donald H. Reeves, Dayton, Ohio, assignor to General Motors Corporation, Dayton, Ohio, a corporation of Delaware Application January 17, 1934, Serial No. 707,003

1 Claim. (Cl. 62—89)

This invention relates to refrigerating apparatus and particularly to refrigerator cabinets of the household type.

Refrigerator cabinets of the household or domestic type are quite frequently positioned or installed in pantries, cupboards or refrigerator rooms located a considerable distance from the housewife's work table in the kitchen at which table food products ordinarily stored in the refrigerator are mixed or prepared prior to serving same. In such installations of refrigerator cabinets the housewife usually opens the refrigerator door, which affords access to the food storage compartment therein, and permits this door to remain open during several trips to and from the kitchen with food products to be assorted, cleaned and/or arranged on dishes prior to serving. Furthermore, the housewife quite frequently prepares individual dishes of salads, desserts or the like long prior to time of serving and places these dishes in the refrigerator cabinet in order to chill or cool the salads or desserts in the dishes to render them more pleasingly palatable. At the time the salads or desserts are to be served at the table the housewife usually removes one or two of the dishes containing the same from the refrigerator cabinet and makes several trips to and from the cabinet to the dinner table before all the dishes are served thereon, during which time the door of the refrigerator is usually permitted to remain open. In addition the housewife quite often finds it desirable to rearrange articles or dishes of food products supported on a certain shelf within the food storage compartment of the cabinet and during this rearrangement it has been customary to remove the food products or dishes from the cabinet to some supporting table or ledge remote from the cabinet in order to successfully carry out the rearrangement process. The door to the food storage compartment of the cabinet is also permitted to remain open over a long period of time during this rearrangement operation. The loss of the cold air from the food storage compartment of the cabinet during the time the door thereof is permitted to remain open obviously results in inefficiency which increases the cost of operating the refrigerating system, employed for maintaining the food storage compartment at a low temperature, and also causes undue and severe strains on the system.

As I am aware that the general idea of associating a serving tray with a refrigerator cabinet for facilitating the removal from the cabinet of a great many articles or dishes at one time in order to overcome the foregoing disadvantages of conventional refrigerators has been previously proposed, I wish it to be understood that the purpose of the present invention is to provide an improved apparatus. By virtue of locating a removable or detachable serving tray in a more readily accessible position in a refrigerator cabinet, than has previously been suggested, I provide an improved apparatus which greatly facilitates removal of articles from the cabinet to the tray or from the cabinet to a locality remote therefrom with the aid of the tray.

An object of the present invention is to provide a refrigerator cabinet with a detachable or removable serving tray and to locate the tray within the food storage chamber or compartment of the cabinet in such a position that the tray will not occupy valuable food storage space in the food storage chamber.

Another object of the invention is to provide a refrigerator cabinet with a detachable or removable serving tray and to mount the tray within the food storage chamber or compartment of the cabinet in such manner as to permit the same to be moved outwardly of the chamber, when the door affording access thereto is opened, and to support the tray in this outward position so that it may be utilized as an auxiliary food support during rearrangement of articles located on a shelf within the food storage chamber.

Further objects and advantages of the present invention will be apparent from the following description, reference being had to the accompanying drawings, wherein a preferred form of the present invention is clearly shown.

Figure 1:
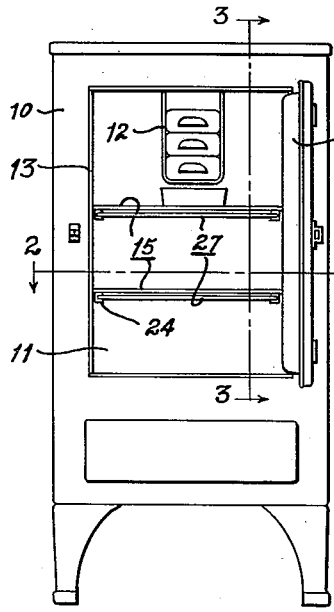
Fig. 1 is a front elevational view of a household refrigerator having the present invention embodied therein.
Figure 2:
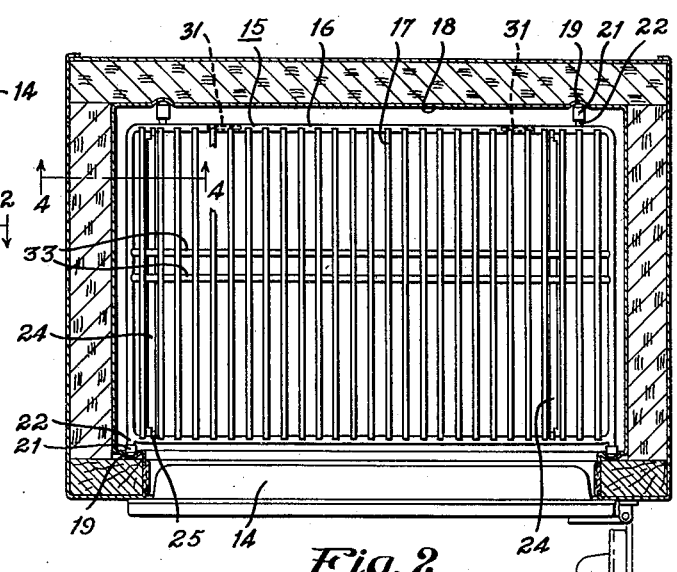
Fig. 2 is an enlarged horizontal sectional view of the refrigerator cabinet taken on line 2—2 of Fig. 1, showing the tray of the present invention omitted therefrom for the sake of clearness.

Referring to the drawings for the purpose of illustrating my invention I have shown in Fig. 1 a suitably insulated refrigerator cabinet of the domestic or household type generally designated by the numeral 10. The cabinet 10 includes a food storage chamber or compartment 11 having an evaporator or cooling unit 12 mounted in the upper portion thereof and adapted to be connected to any suitable or conventional refrigerant liquefying and condensing unit. The cooling effect of the evaporator 12 refrigerates and causes circulation of air in the food compartment 11 in the well-known manner. The food storage chamber or compartment 11 of cabinet 10 is provided with a door opening 13 providing access to the chamber 11 and which opening is ordinarily closed by a door 14. The food storage chamber 11 is divided into a plurality of vertically disposed horizontally extending food storage chambers or compartments by vertically spaced and horizontally disposed wall or partitioning members or shelves 15. Each of the shelves 15 includes a round rim member 16 and a plurality of flat food supporting cross members 17 (see Figs. 2 and 4). The front and rear vertical portions of lining 18 of the food storage chamber 11 are provided with indentations 19 at desired elevations in the food storage compartment. Semi-solid rubber plug members 21 are threaded or otherwise adjustably mounted upon studs 22 extending from the rim 16 of shelf 15. A pair of these plug members are located at the rear of the shelf while another pair thereof are located at the front of the shelf (see Fig. 2). The plug members 21 at least on one side of the shelf are threaded on studs 22 toward the rim member 16 of shelf 15 upon initially placing the shelf in the chamber 11 and after the shelf has been placed within food storage chamber 11 the plug members 21 are threaded outwardly from the rim of the shelf to tightly engage the depression or indentations 19 in the food storage chamber lining, thus firmly securing the shelf in a stationary position within the cabinet. The shelf supporting structure herein disclosed forms no part of the present invention and is shown only incidentally. A more detailed showing and description of this shelf supporting structure may be had, if desired, by referring to the copending application Serial No. 483,177 of Harry B. Hull and Curtis E. Kampman, filed Sept. 20, 1930, now Patent No. 1,997,793.

A pair of U-shaped members 24 are provided at each end thereof with an ear 25 which is bent over and secured to the top of rim 16 of shelf 15. The U-shaped members are mounted so that the legs thereof are horizontally disposed in order to permit them to serve as a track for slidably and removably supporting a serving tray 27 from the shelf 15. The substantially flat serving tray 27 comprises a rim member 28 and food supporting flat cross members or bars 29 welded or otherwise secured to the rim member 28. A pair of any suitably shaped lug pieces 31 are secured to the underside of the rear portion of rim member 16 on shelf 15 and these pieces serve as or form a stop for the tray 27, when moved into the cabinet, in order to prevent the tray from striking and damaging the lining at the rear of the food storage chamber (see Figs. 2 and 3).

Figure 3:
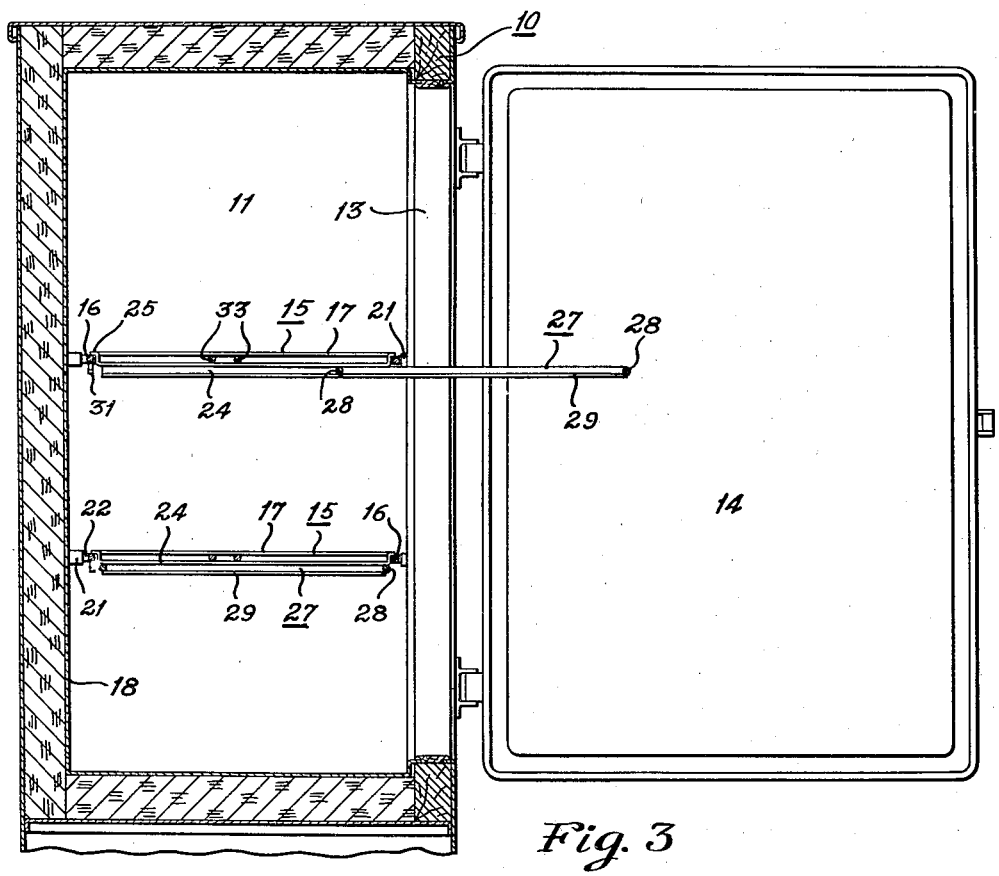
Fig. 3 is an enlarged vertical sectional view of the cabinet taken on line 3—3 of Fig. 1 and showing the food compartment door in open position.

It will be noted that the serving tray is removably supported within the food storage chamber 11 in substantially the same horizontal plane as the shelf or food compartment dividing wall members 15. In other words the tray is supported in a horizontal plane adjacent and below the plane of the shelf or dividing member 15. The tray is thus positioned within the food storage chamber in such a location as to not occupy any valuable food storage space therein. The tray 27 may serve the purpose of a combined food support and removable serving tray. Referring to Fig. 3 of the drawings it will be observed that the door 14 to the food storage chamber 11 may be opened and since the trays are of smaller width than the door opening 13 any one of the trays 27 may be moved outwardly of the shelf 15 and food storage chamber 11 as shown, while being supported by the U-shaped tracks 24 secured to the shelf. In this extended position the tray 27 serves as an auxiliary support for supporting articles to be removed from the shelf 15 for transference from the cabinet 10 or for supporting articles removed from shelf 15 during rearrangement of the various articles supported on the shelf 15. It is obvious that the tray 27 can be removed from the shelf 15 and its supporting tracks 24 by moving or sliding the tray beyond the front ends of the tracks 24. Either of the plurality of trays 27 can therefore be substantially loaded with food products, taken from the shelf 15, while being supported substantially in the same horizontal plane as the shelf and can then be removed or detached from the cabinet 10. The tray 27 when in the extended position shown in Fig. 3 is disposed in the path of cold air flowing outwardly of chamber 11 while door 14 is open and this cold air flows over food products or dishes in which same is contained and supported on tray 27 to refrigerate the food to thereby prevent same from being unduly warmed during rearrangement of the food within the storage compartment.

Figure 4:
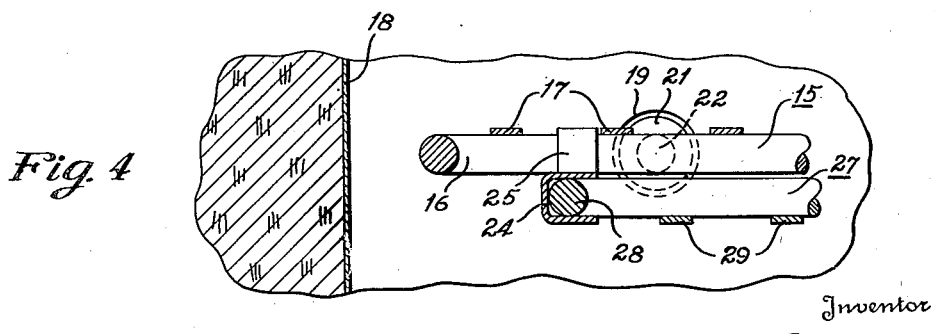
Fig. 4 is an enlarged fragmentary sectional view of a portion of the cabinet taken on the line 4—4 of Fig. 2.

By referring to Fig. 4 of the drawings it will be observed that the food supporting cross members 29 are secured to the underside of rim member 28 of the tray 27 thus permitting the rim member 28 to serve as means for preventing food products or dishes containing same, from sliding off of the serving tray during transference of same from the refrigerator cabinet. The food supporting cross members 17 of the shelves 15 are secured to the top of the rim member 16 thereof and these shelf cross members 17 are prevented from being bent downwardly into the path of the slidable serving tray by a pair of relatively heavy transverse members 33 (see Figs. 2 and 3). These transverse members tend to strengthen the shelf 15 in order to maintain its original rectangular shape.

Figure 7:
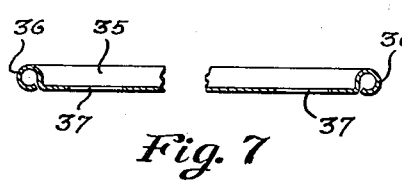
Fig. 7 is a sectional view of the modified type of a tray taken on line 7—7 of Fig. 6.
Figure 5:
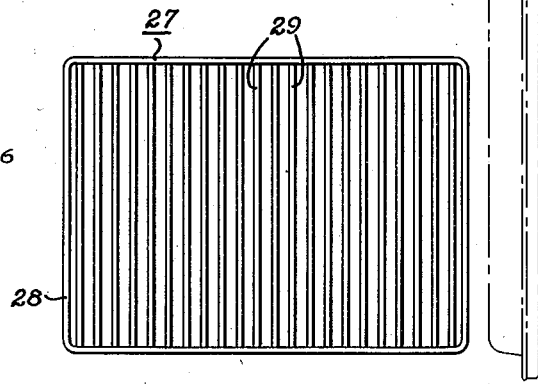
Fig. 5 is a detail plan view of a serving tray removed from the refrigerator cabinet and adapted to be supported by a shelf located in the cabinet.
Figure 6:
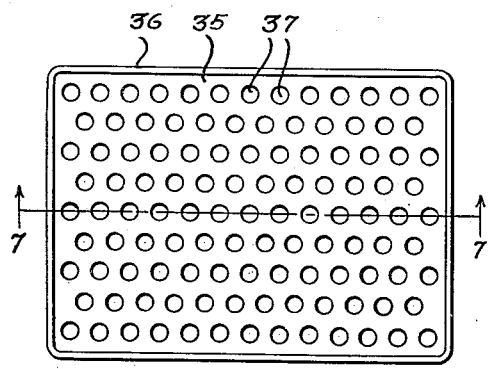
Fig. 6 is a detail plan view of a modified type of serving tray.

If desired the tray or combined support and serving tray may be made in the form of a pressed sheet metal member 35 having a strengthening and supporting rim 36 formed thereon and extending around the boundary thereof (see Figs. 6 and 7). The serving tray, if made of sheet metal as shown in the modification (Figs. 6 and 7) instead of from a plurality of wire members as shown in Fig. 5, will necessarily be provided with a plurality of openings or reticulations 37, of any suitable size or design, to permit circulation throughout and between the chambers of the food storage compartment of the cabinet. Also, if desired, the tray may be made of a non-metallic material. One advantage of a non-metallic serving tray is that the tray, upon being removed from the relatively cold food storage compartment, will not accumulate or cause moisture to collect thereon.

From the foregoing it is apparent that I have provided an improved refrigerator cabinet wherein a serving tray is removably and detachably supported within the food storage chamber of the cabinet in such a position that it occupies no valuable food storage space therein. The improved location of the serving tray permits the tray to be in substantially the same horizontal plane as the food supporting shelf with which it is associated while it is supported in an outwardly extended position relative to the shelf, thus facilitating removal of dishes from the shelf to the tray without danger of spilling the contents of the dishes. In addition the particular location of the serving tray relative to the shelf eliminates stooping and bending on the part of the housewife during the transference of articles from the shelf to the serving tray while the tray is supported outwardly of the shelf prior to removal thereof.

It will also be apparent from the foregoing that the provision for removably supporting the serving tray within the food storage chamber of the refrigerator to provide the improved apparatus also eliminates the construction of a separate compartment in the cabinet, or the construction of a track or rack exteriorly of the cabinet, for the reception of the tray. This not only reduces manufacturing costs of the cabinet but also eliminates the danger of the separate compartment, which is ordinarily very difficult to clean, from becoming contaminated, thus resulting in unsanitary conditions within the compartment. By locating the tray within the food storage chamber of the refrigerator cabinet it is also concealed from dust or dirt circulating or deposited exteriorly of the cabinet.

While the form of embodiment of the invention as herein disclosed, constitutes a preferred form, it is to be understood that other forms might be adopted, all coming within the scope of the claim which follows.

What is claimed is as follows:

A refrigerating apparatus comprising in combination, a cabinet having a compartment therein and a door normally closing an access opening to said compartment, means for cooling and causing circulation of air within said compartment, a food supporting shelf disposed within said compartment and dividing the interior thereof into superimposed food storage spaces, a flat auxiliary shelf and means for slidably supporting same in said compartment in a position between a face of the first mentioned shelf and a plane parallel to and closely adjacent the face thereof, said first mentioned shelf and said auxiliary shelf being reticulated for the flow of cool circulating air therethrough and through the superimposed food storage spaces in said compartment, said flat auxiliary shelf being movable outwardly of said compartment through the access opening thereof while being supported from within the compartment to a position in which it forms a cool ledge for the support of food products during rearrangement thereof in said compartment and in which position refrigerated air from said compartment may flow across the food products supported thereon, and said flat shelf or cool ledge being detachable from said cabinet by sliding same from said compartment whereby it may be utilized as a serving tray.

DONALD H. REEVES.